United States Patent [19]

Spekman

[11] Patent Number: 4,952,320

[45] Date of Patent: Aug. 28, 1990

[54] CHROMIUM RECOVERY PROCESS

[75] Inventor: Paul Spekman, Minneapolis, Minn.

[73] Assignee: Fremont Industries, Inc., Shakopee, Minn.

[21] Appl. No.: 199,996

[22] Filed: May 26, 1988

Related U.S. Application Data

[63] Continuation of Ser. No. 927,173, Nov. 5, 1986, abandoned.

[51] Int. Cl.⁵ .............................................. C02F 1/42
[52] U.S. Cl. .................................. 210/669; 210/684; 423/54
[58] Field of Search ............... 210/684, 189, 282, 669; 423/54, 607

[56] References Cited

U.S. PATENT DOCUMENTS 3,951,811  4/1976  Casolo et al. ...................... 210/282
4,012,318  3/1977  Hayashi ............................. 210/684

Primary Examiner—Ivars Cintins
Attorney, Agent, or Firm—Orrin M. Haugen; Thomas J. Nikolai; Frederick W. Niebuhr

[57] ABSTRACT

A process for removal and recovery of chromium ions (chromate, dichromate, or combinations thereof) from aqueous waste water of surface treatment phosphatizing solutions and for recycling of the treated waste water following replenishment wherein the aqueous waste water is initially partially clarified in a settling tank, with the effluent then being passed through an ion exchange column for removal of substantially all of the chromium ions therefrom. Following treatment in the ion exchange resin column, the chromium-free material is recharged with a supply of fresh chromium ions until the chrome ion content is at the desired level for metal surface treatment. The spent ion exchange resin columns are removed and replaced, as necessary, with the recharge of the resin columns making additional chromium available as a resource.

4 Claims, 1 Drawing Sheet

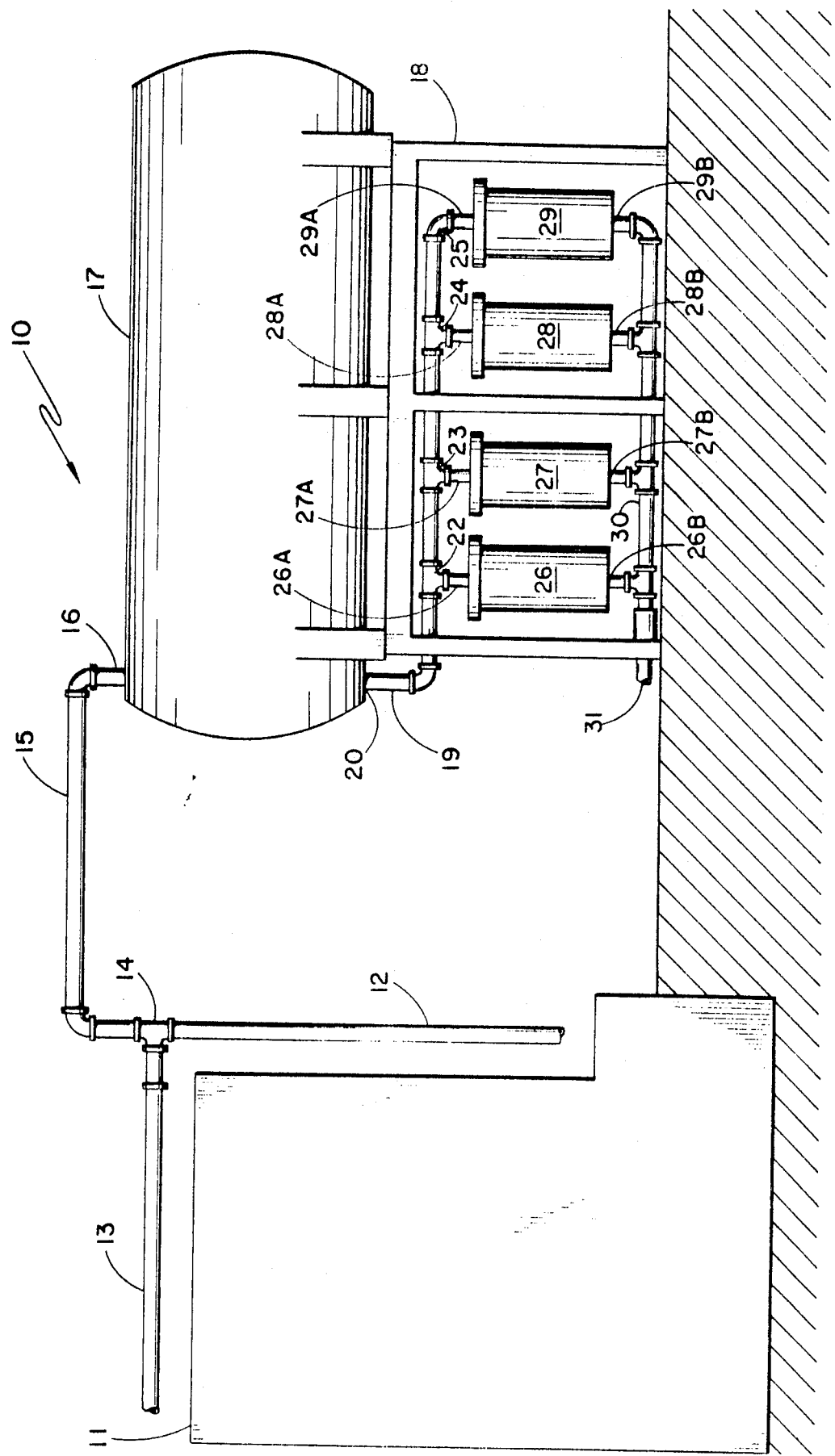

CHROMIUM RECOVERY PROCESS

This is a continuation of application Ser. No. 06/927,173, filed Nov. 5, 1986, now abandoned

BACKGROUND OF THE INVENTION

The present invention relates generally to a system for removal of chromium ions, in either hexavalent or trivalent form from the waste water of metallic surface treatment solutions, and for the recycling of the treated waste water through subsequent replenishment of the chromium ion content. Specifically, the present invention relates to a process for treatment of the chromium ion containing waste water through passage of the waste water through a settling/clarifying vessel, and withdrawal of the effluent to a holding vessel for gravity passage through active ion exchange resin columns. The process of the present invention permits use of the highly desirable chrome-based seal rinses employed in aqueous pretreatment of metals, without posing ecological dangers.

In the manufacturing industry where painted metallic parts are being produced, pretreatment of metallic surfaces through phosphatizing is extremely common. In conjunction with the phosphatizing, a chrome-based seal rinse operation is highly desirable. Such operations, including spray and dip operations, have been widespread in the past, but recent concern with ecological factors has led to attempts to substitute other materials for the chrome-based seal rinse.

Substitutions for the chrome-based seal rinses have not been favorably received. Generally, the surface treatment through exposure to chrome-based seal rinses has provided industry as well as the consumer with a durable corrosion-resistant surface following coating with organic polymeric films. The paint industry, as well as the manufacturing industry have been unable to find acceptable substitutes for the chrome-based seal rinse solutions employed in the past.

While the reasons for the failure of acceptable substitutes are numerous, it has frequently been found that surface adhesion of organic polymeric coatings such as paints has been inferior. Accordingly, it has been found desirable to find alternate systems and/or techniques for disposal of chromate and dichromate containing waste water solutions so that chrome-based solutions may be utilized. Paints and related materials applied to ferrous and nonferrous metals tend to achieve better adhesion and bonding to the substrate which has been treated so as to be slightly acidic, generally in the pH of between about 3.0 and 6.5. Furthermore, freedom from contaminants generally provides more uniform films along with enhanced adhesion.

SOLUTIONS EMPLOYED AND THEIR APPLICATION

Chrome-based seal rinses have been described in a variety of sources, including U.S. Pat. Nos. 2,882,189; 2,927,046; and 3,279,958, with these patents describing utilization of chromate in rinse solutions containing chromic acid. In addition, alkaline metal dichromate salts have been used, and described in U.S. Pat. No. 3,222,226. Another form of hexavalent chromium, partially reduced to trivalent chromium (with formic acid) is described in U.S. Pat. No. 3,063,877. Further examples of hexavalent-trivalent chromium treatment combinations are found in U.S. Pat. Nos. 3,864,175 and 4,341,558, with the latter describing solutions containing aluminum chromate polymers. As indicated above, however, environmental concerns have led to diminished utilization of these formulations.

ENVIRONMENTAL AND ECOLOGICAL CONCERNS

Recently, through the work of various pollution control commissions at Federal, State, and local levels have led to regulations applying to the metal-finishing industry which limits average daily discharge to 2.8 ppm total chromium entering a municipal sewage treatment facility. In addition, total limits are frequently placed upon total chromium entering a municipal sewage treatment facility in a given 24 hour period. As a result, the overall effect on the metal-finishing industry has been to reduce, if not eliminate, typical chromium constituents from paints as well as seal rinses. This has, of course, the effect of placing a greater burden on the quality of metal pretreatment prior to painting or applying of related film materials to both ferrous and nonferrous metals.

With the restrictions having been placed upon manufacturers, one chrome containing waste water treatment alternative is the physical removal and shipment of vessels containing the chrome solution for treatment at a remote facility. Such transportation, however, has its limitations inasmuch as chromate and dichromate containing solutions are frequently treated as hazardous waste products and require unusual, expensive, and specific transport regulations. The added cost and economic burden imposed by such disposal does, of course, lead to alternate approaches.

ALTERNATIVE SOLUTIONS AND THEIR DISADVANTAGES

Because of the familiarity and high quality results obtained with chrome-based final rinses, there has been a reluctance on the part of industry to move to chrome alternatives. Among those non-chrome alternatives are ascorbic acid with molybdenum described in U.S. Pat. No. 4,120,996, potassium permanganate solutions described in U.S. Pat. No. 3,720,547, as well as molybdenum and aluminum nitrate described in U.S. Pat. No. 3,819,423, as well as other heavy metal-based rinses described in U.S. Pat. No. 3,895,970. While other non-chrome based materials may be available, these as listed above, may present their own unique problems with respect to ultimate and complete disposal.

ION EXCHANGE FEATURES

In accordance with the present invention, an ion exchange operation is utilized which presents unique advantages over prior art techniques for chromate and/or dichromate disposal. The ion exchange column most desirable in connection with the operations of the present invention is a weakly basic anionic exchange resin, which permits utilization of a dichromate containing solution for its greater chromium disposal capacity. In addition, the regeneration of the weakly basic anionic exchange resins permits the use of sodium hydroxide, without requiring additional quantities of sodium chloride or other materials. The weakly basic anionic exchange resin may be received and retained in cloth mesh bags, normally polypropylene, and as such may be retained in those containers for insertion and/or removal from ion exchange resin column receiving chambers as more fully set forth hereinafter.

THE PRESENT INVENTION

In accordance with the present invention, stated briefly, the invention relates to a process for removal and recovery of chromium ions (normally as chromate and/or dichromate) from aqueous waste water of chrome-based seal rinses, and for recycling the treated waste water through replenishment of the chrome content for reuse in metallic surface treating operations.

The process includes the steps of withdrawing the aqueous waste water containing chromium ions from the surface treatment bath for settling of solid impurities and/or sludge therefrom so as to form a partially clarified chrome containing solution. The effluent from the partially clarified solution is then moved to an elevated holding vessel whereupon it is passed through a supply manifold, in parallel, to a plurality of generally elongated active ion exchange resin columns where substantially all of the chromium ions are removed. The spent ion exchange resin columns are removed for recharging in a remote facility, with the spent columns being replaced with recharged active resin columns. Because of the bonding of the chromate and/or dichromate to the resin column or bed, transportation and/or moving of the ion exchange columns may be accomplished without the concerns normally present when raw waste water containing chromate and/or dichromate may be present.

In the utilization of surface treatment solutions treated in accordance with the present invention, it has been found that the recycling of the aqueous chromium-free solution product permits utilization of lower concentrations of chromate and/or dichromate than is possible with freshly made up solutions. Water, particularly fresh industrial water supplies contain a sufficient quantity of ionic contaminants, such as calcium, magnesium, iron, manganese, and the like, so as to require higher chromate and/or dichromate concentrations for achieving acceptable results. The aqueous chromium-free solution product obtained after passage through an active ion exchange resin column has been found capable of use with a lower concentration of chromate and/or dichromate in the working solution while achieving comparable results.

SUMMARY OF THE INVENTION

Therefore, it is a primary object of the present invention to provide an improved process for removal and recovery of chromium ions from aqueous waste waters of chrome-based seal rinse surface treatment solutions, and for the recycling of such treated seal rinse solutions to fresh chromate and/or dichromate containing surface treatment solutions.

It is a further object of the present invention to provide an improved process for the removal and recovery of chromium ions from chrome-based seal rinse surface treatment solutions, wherein the waste water is initially clarified in a settling tank, and thereafter permitted to pass through an ion exchange resin column under the influence of gravity for removal of substantially all of the chromium ions therefrom. The treated chromium ion free solution is then recycled to be reused in the surface treatment operation.

Other and further objects of the present invention will become apparent to those skilled in the art upon a study of the following specification, appended claims, and accompanying drawing.

IN THE DRAWING

The drawing is a schematic diagram of a typical processing system employing the treatment operations of the present invention.

DESCRIPTION OF THE PREFERRED EMBODIMENT

In accordance with the preferred embodiment of the present invention, a process is provided for removal and recovery of chromium ions from aqueous waste water of chrome-based seal rinse surface treatment solutions. The process contemplates recycling of the treated waste water following replenishment of the chrome content of the treated waste water, as will be more apparent hereinafter. Typical chrome-based seal rinse solutions are well known, and may be formulated as set forth in Examples 1–5 hereinbelow, with these examples providing typical formulations for the concentrates:

EXAMPLE 1

| | |
|---|---|
| Chromic Acid ($CrO_3$) ($H_2CrO_4$) | 12–25% w/w* |
| Water | Balance |

(*percent weight based upon weight of water.)

EXAMPLE 2

| | |
|---|---|
| Chromic Acid ($CrO_3$) | 12–25% w/w |
| Phosphoric Acid ($H_3PO_4$) | 12–25% |
| Water | Balance |

EXAMPLE 3

| | |
|---|---|
| Sodium Chromate ($Na_2CrO_4$) Sodium Dichromate ($Na_2Cr_2O_7$) Chromic Acid ($CrO_3$) ($H_2CrO_4$) | 12–25% w/w |
| Phosphoric Acid ($H_3PO_4$) | 12–25% w/w |
| Water | Balance |

EXAMPLE 4

| | |
|---|---|
| Sodium Chromate Sodium Dichromate Chromic Acid Phosphoric Acid Dowfac 3B2 | 12–25% w/w |
| Petronate BA | 0.1–1.0% |
| Water | Balance |

EXAMPLE 5

| | |
|---|---|
| Hexavalent Chromium from above sources | 12–25% w/w |
| Trivalent Chromium | 1–10% |
| Water | Balance |

Working solution utilizing such concentrates will normally provide chromate concentrations in the level of up to about 500 ppm of chromium in the form of hexavalent, trivalent, or combinations thereof.

Further, in accordance with the present invention, the spent or used working solution is carried from the operative station through withdrawal to a first reservoir in the form of a settling and/or clarifying tank, one of which is shown at 11. Upon settling of sludge or other solid particles therefrom, the effluent is passed along lines 12 and 13, through suitable valving as at 14, and into lines 15 and 16 to the elevated holding vessel 17. Frame means as at 18 support the holding vessel 17, as indicated in the drawing. After elevation into holding vessel 17, the effluent is then passed, under influence of gravity, through line 19 and to suitable valving and lines as at 20, 22, 23, 24, and 25, all of which function as a supply manifold, and thence into one of several parallelly configured active ion exchanged resin column reservoirs. These reservoirs or chambers are designated 26, 27, 28 and 29 and flow is controlled through valves and lines as at 26A, 27A, 28A and 29A. In the ion exchange resin column, substantially all of the chromium ions are removed, with the treated solution then entering a discharge valve as at 26B, 27B, 28B and 29B and thence into a manifold such as at 30, and ultimately to a supply reservoir through treated liquid supply line 31. Suitable check valves may be provided at the outlet of each of the ion exchange resin columns so as to reduce or prevent cross-contamination or unusual flow patterns. The treated chromium-free effluent received in line 31, is then passed to a reservoir as at 11, where a supply of fresh chromium ions in the form of chromate, dichromate, or trivalent chromium is added until the chrome content is at its desired level for continued utilization of the treated solution in metal surface treatment operations. Upon loading of the ion exchange resin column with chromium, the spent ion exchange resin material is removed for regeneration and ultimate replacement into the ion exchange resin column receiver or chamber.

ION EXCHANGE RESIN

As has been indicated, a preferred form of ion exchange resin is a strongly basic anionic exchange resin. Such resins are, of course, commerically available and permit acidification of the feed in order to increase the capacity of the resin. Of course, it will be appreciated that weakly basic anionic exchange materials may be utilized as well, it being noted that the weakly basic anionic exchangers permit the treatment of more highly acid chromate solutions, thus achieving the enchanced adsorption of the dichromate form, because of the capacity of ion exchange sites. Weakly basic anionic exchange resins, as well as certain strongly basic resins may be regenerated with caustic soda alone, without requiring presence of sodium chloride in the regeneration solution.

For strongly basic anionic exchange resins, the following reactions may be deemed typical:

EXAMPLE 6

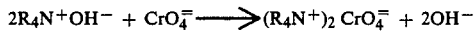

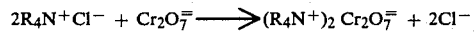

The exchange reactions for weakly basic anionic exchange resins is set forth hereinbelow:

EXAMPLE 7

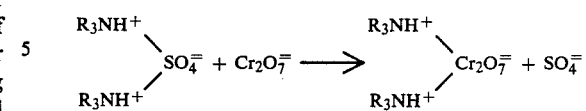

Strongly and weakly basic anion exchange resins are commercially available, with one weakly basic material such as Amberlite IRA-94, being available from Rohm and Haas Company of Philadelphia, Pa.

The post-treatment solution is preferably recycled for use, following replenishment of the chromium content. The solution discharged from the system has been found to normally contain less than about 0.5 ppm of chrome. The exhausted or loaded ion exchange material is then regenerated, with the absorbed chromate then being collected to create a raw chrome supply which may be ultimately returned and reused in the manufacturing process. Thus, total utilization of the chromate is achieved without passage of the spent chrome material into the environment. A closed-loop recycling is achieved for treatment of metallic surfaces, including ferrous and nonferrous articles prior to painting.

As indicated earlier, a surprising or unexpected result in the present system has been the improved quality of the media following passage through the system of the present invention. A reduction in the amount of seal rinse chromate ion concentration required to produce a solution of equal performance as contrasted to a solution chargged to the regular levels utilizing fresh plant process water.

As has been indicated above, strongly basic anion exchange resins are preferable. Such materials are available from Rohm and Haas Company under the code name "Amberlite IRA-400". Strongly basic anionic exchange resins have demonstrated superior results with respect to chrome capacity and efficient absorption, as well as pysical stability to the oxidative effects of the chromate medium. Also, ease of regeneration is a factor.

In the schematic illustrated, ion exchange column resin reservoirs or chambers 26, 27, 28 and 29 are illustrated. These chambers are constructed of reinforced fiberglass with a wall thickness of about ¾ inch . A removable cover is provided which is fitted with a pressure gauge indicating levels, preferably, of from zero to 20 pounds per square inch. A straining mesh basket may be and is preferably utilized for pre-filtering any debris from the seal rinse solution. The ion exchange resin is contained in a polypropylene bag filled with, for example, 32 pounds of exchange media, thereby permitting the exchange media to be stacked, one on the other, for efficient use in the chamber. Typically, chamber dimenions are such that the internal diameter is 18.5 inches and 36 inches in length. Optimum flow rates tend to be approximately 10 to 20 gallons per minutes, thus providing adequate solution contact time with the exchange media to achieve chrome removal to a constant 0.2 ppm level of below. Typically, such chrome removal levels can be achieved with chamber pressures of between 5 and 6 psi. Regeneration may be obtained by utilization of caustic, such as preferably a 4 percent NaOH solution.

By way of further example, cells containing 32 pounds of exchange resin are capable of processing between 700 and 800 gallons of seal rinse solution containing an initial level of about 160 ppm of total chromium.

In accordance with the typical utilization of the process set forth herein, analysis of process water typically may be as follows:

TABLE I

| PROCESS WATER ANALYSIS | | | |
|---|---|---|---|
| Data | Raw Water | Used Seal Rinse Solution | Treated Seal Rinse Solution |
| pH | 7.38 | 5.72 | 6.70 |
| Total Hardness CaCo$_3$ | 470 ppm | 540 ppm | 460 ppm |
| Calcium Hardness CaCO$_3$ | 330 ppm | 360 ppm | 330 ppm |
| Magnesium Hardness CaCO$_3$ | 140 ppm | 180 ppm | 130 ppm |
| Alkalinity | — | — | — |
| P | 0 | 0 | 0 |
| M.O. | 460 | 120 | 175 |
| Conductivity | 2010 | 2530 | 3170 |
| Fe Total | 0.09 ppm | 3.43 ppm | 0.04 ppm |
| Sulfate | 710 ppm | 980 ppm | 20 ppm |
| Chrome Content: | | | |
| Hexavalent form | 0 | 120 ppm | 0.4 ppm |
| Trivalent form | 0 | 20 ppm | 0.0 ppm |

Water quality, after passing through the process, was improved to such a degree that when recharged with fresh chromium, only 50 percent of the normally recommended charge of chromium was required to produce a seal rinse solution of the proper operating pH and performance characteristics.

It will be appreciated, of course, that various modifications may be made of the process without departing from the spirit and scope of the invention herein.

What is claimed is:

1. In a process for removal and recovery of chromium ions from aqueous waste water of spent chrome-based seal rinse surface treatment solutions and for recycling the treated spent waste water through replenishment of the chrome content of said treated waste water for reuse, said process including the steps of:
   (a) withdrawing the spent aqueous waste from a first metallic surface treatment bath containing chromium ions at a concentration of about 160 ppm to a first reservoir for settling of solid impurities therefrom, holding said spent waste water in said reservoir until the chromium-containing solution becomes at least partially clarified through settling out of particulate solids so as to obtain a partially clarified chromium-containing effluent solution from said chromium-containing spent waste water solution;
   (b) passing said effluent from said partially clarified chromium-containing solution directly to a holding vessel at an elevated disposition;
   (c) thereafter passing said effluent from said holding vessel into a supply manifold to which there are coupled a plurality of anionic ion exchange resin column receiving chambers where substantially all of the chromium ions are removed, and thereafter passing said chromium-free effluent solution into a discharde manifold and thence directly to a supply reservoir;
   (d) recharging said chromium-free effluent solution in the supply reservoir with a supply of fresh chromium ions until the chromium ion content is at a desired level for metal surface treatment, introducing said recharged effluent into said first metallic surface treatment bath; and
   (e) removing and replacing the anionic ion exchange resin columns when exhausted.

2. The process as defined in claim 1, wherein said ion exchange columns are retained in removable receptacles within said chambers for accommodating the removal and replacement operation.

3. The process as defined in claim 1, wherein said ion exchange resin columns are strongly basic anionic ion exchange resins.

4. The process as defined in claim 1, wherein said effluent passing through said anionic ion exchange resin column receiving chamber is at a pressure of between 5 and 6 psi.

* * * * *

UNITED STATES PATENT AND TRADEMARK OFFICE
CERTIFICATE OF CORRECTION

PATENT NO. : 4,952,320

DATED : August 28, 1990

INVENTOR(S) : Paul Spekman

It is certified that error appears in the above-identified patent and that said Letters Patent is hereby corrected as shown below:

Column 7, line 40, after "waste" insert -- water --.

Column 8, line 20, "discharde" should read -- discharge --.

Signed and Sealed this

Twenty-ninth Day of October, 1991

Attest:

HARRY F. MANBECK, JR.

*Attesting Officer*      *Commissioner of Patents and Trademarks*